(12) United States Patent
Bakke (10) Patent No.: US 7,366,902 B2
(45) Date of Patent: Apr. 29, 2008

(54) SYSTEM AND METHOD FOR AUTHENTICATING A STORAGE DEVICE FOR USE WITH DRIVER SOFTWARE IN A STORAGE NETWORK

(75) Inventor: Mark A. Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/736,414

(22) Filed: Apr. 17, 2007

(65) Prior Publication Data

US 2007/0192614 A1 Aug. 16, 2007

Related U.S. Application Data

(63) Continuation of application No. 10/402,036, filed on Mar. 28, 2003, now Pat. No. 7,231,518.

(51) Int. Cl.
*H04L 9/00* (2006.01)
*H04L 9/32* (2006.01)
(52) U.S. Cl. ........................................ 713/168; 726/29
(58) Field of Classification Search ............... 713/168; 726/29
See application file for complete search history.

(56) References Cited

U.S. PATENT DOCUMENTS 6,360,320 B1 * 3/2002 Ishiguro et al. ............. 713/164

7,231,518 B1 * 6/2007 Bakke ........................ 713/168

OTHER PUBLICATIONS

"U.S. Appl. No. 10/402,036, Non-Final Office Action mailed Jul. 7, 2006", 7 p.
"U.S. Appl. No. 10/402,036, Notice of Allowance mailed Jan. 10, 2007", 7 p.
"U.S. Appl. No. 10/402,036, Response filed Sep. 28, 2006 to Non-Final Office Action mailed Jul. 7, 2006", 14 p.

* cited by examiner

*Primary Examiner*—Gilberto Barron
*Assistant Examiner*—Kristin D Sandoval
(74) *Attorney, Agent, or Firm*—Schwegman, Lundberg & Woessner, P.A.

(57) ABSTRACT

A method and system authenticates a storage device or storage router for use with driver software. The driver software may be permitted to be used with particular storage devices including storage routers and may be prohibited from being used with other storage devices or routers. In some cases, this may allow a vendor to restrict the use of its driver software, or at least certain functionality, to use with the vendor's storage devices or storage routers. A proof of purchase request is sent by a client device to a server over an IP network to authenticate the storage device or router (e.g., a server). The request may include a random number and one or more identifiers. The identifiers may include a server identifier, a software driver identifier and/or a client device identifier. The driver software may permit storage related communications with the server when a hash received from the server matches a hash internally generated by the software driver.

9 Claims, 5 Drawing Sheets

SYSTEM AND METHOD FOR AUTHENTICATING A STORAGE DEVICE FOR USE WITH DRIVER SOFTWARE IN A STORAGE NETWORK

CROSS REFERENCE TO RELATED APPLICATIONS

This application is a continuation of U.S. patent application Ser. No. 10/402,036, filed on Mar. 28, 2003, now U.S. Pat. No. 7,231,518, issued on Jun. 12, 2007, which is incorporated herein by reference.

TECHNICAL FIELD

The present invention pertains to storage networks and storage systems, and in some embodiments, to software drivers for use with storage area networks, and in particular, to software drivers for use with storage networks that may implement the Small Computer Systems Interface (SCSI) protocol.

BACKGROUND

Storage routers allow devices, such as PCs and servers and other computer systems, to utilize the massive storage capability of a storage area network. Communications with a storage router by such devices may be provided over an IP network and may implement a predetermined physical layer protocol, such as an IP/Ethernet protocol. The storage router acts as server and may access storage devices of the storage area network using another predetermined physical layer protocol. In the case of a fibre-channel network, the storage router may communicate with the storage network using a fibre-channel protocol. Some storage area networks may also implement a storage specific protocol, such as the Small Computer Systems Interface (SCSI) protocol. The SCSI protocol, among others, may be used for storage related communications between client devices and SCSI storage devices either directly or through the storage router. In these SCSI systems, SCSI requests, commands and responses may be encapsulated in IP/Ethernet packets for communications between the client devices and the storage router. SCSI requests, commands and responses and may also be encapsulated in a storage network specific protocol packets, such as fibre-channel frames, for communications between the storage router and SCSI storage devices.

Conventional client devices, including SCSI clients, use drivers to communicate with a storage router over an IP network. The drivers may include both driver hardware and driver software components. The vendor that provides the driver software may also provide storage devices or routers, however other vendors may also provide storage devices or routers.

Because a vendor may provide its driver software without charge or for a nominal charge for use with the vendor's storage devices or routers, it may desirable to restrict the driver software, or at least certain functions of the driver software, to use with that vendor's storage devices or routers. It may also be desirable for a vendor to charge a fee for use of its driver software, or enhanced functionality thereof, when used with other vendor's storage devices or routers. Purchase agreements and software licensing agreements for driver software may permissibly include such limitations and restrictions, however such agreements are difficult if not impossible to enforce.

Thus there is a general need for a system and method that authenticates a storage router for use with particular driver software. What is also needed is a system and method in which driver software, or at least features thereof, may be permitted to be used with particular storage devices or routers and may be prohibited from being used with other storage devices or routers.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Embodiments of the present invention provide a method and system in which driver software authenticates a storage router. In embodiments, the driver software may be permitted to be used with particular storage devices or routers and may be prohibited from being used with other storage devices or routers. Embodiments of the present invention may also allow a vendor to charge for driver software when the software is used with storage devices or routers not provided by the vendor.

In some embodiments, driver software may be installed on a client device and may send a proof of purchase request (POP) to a server. The server may be a Small Computer Systems Interface (SCSI) protocol server, such as a SCSI storage router, which communicates with SCSI storage devices over a storage network. The client device receives a response from the server for use in authenticating the server. The server is authenticated when the client device receives the proper response. In one embodiment, if the server is authenticated, the client device may be able to communicate with the server. In another embodiment, if the server is authenticated, certain functions (e.g., network boot) of the driver software may be enabled for communications with the server. When the server is not authenticated, in one embodiment, the driver software may be disabled while in other embodiments, certain functions of the driver software may be disabled. Accordingly, driver software, when provided by a particular vendor, may take advantages of certain features of that vendor's storage devices or routers. In some embodiments, the present invention may even enhance enforcement of terms of a purchase agreement or a software licensing agreement for the driver software which may permissibly limit or restrict use of the driver software.

In embodiments, a POP request is sent by a client device to a server over an IP network to authenticate the server. The request may include a random number and one or more identifiers. The identifiers may include a server identifier, a software driver identifier and/or a client device identifier. The driver software may permit storage related communications with the server when a hash received from the server matches a hash internally generated by driver software running on the client device. The driver software may also deny at least some storage related communications with the server when the hash received from the server does not match the internally generated hash. The server may generate the hash using the random number received in the POP request, a secret key stored in the server and the one or more identifiers. At the client device, the hash is internally generated using the random number, a secret key stored in the client device and the one or more identifiers. In embodiments, the secret key may be stored in the software driver in secure fashion and may be encrypted or stored in split portions. In embodiments, the secret key may also be stored in the server in a secure fashion in either a hardware or software form.

Accordingly, embodiments of the present invention may permit a vendor's driver software to be used only with certain storage devices or routers and not other storage devices or routers. The embodiments, however, may allow the vendor's storage devices or routers to be used with other vendor's driver software. Storage devices or routers may accordingly be authenticated as genuine storage devices or routers of a particular vendor.

Figure 1A:
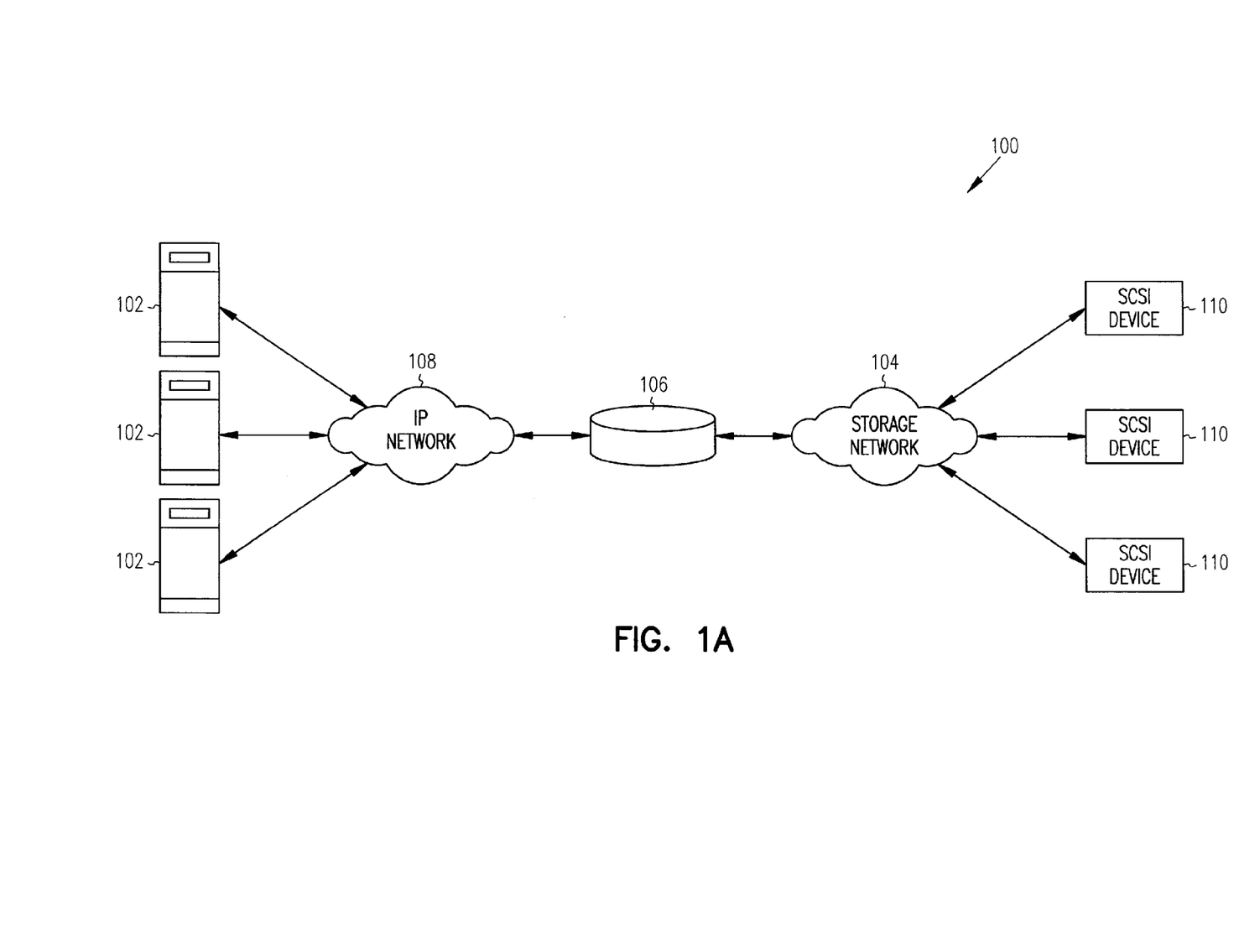
FIG. 1A illustrates a storage system in accordance with embodiments of the present invention.

FIG. 1A illustrates a storage system in accordance with an embodiment of the present invention. Storage system 100 may provide storage capability of storage network 104 for client devices 102. Client devices 102 may communicate storage related communications with storage router 106 over network 108 for storing and accessing data on devices 110. In embodiments, the storage related communications include small computer systems interface (SCSI) protocol requests, responses and commands, which may be encapsulated in TCP/IP packets for communication over network 108. These communications may be unencapsulated by storage router 106, and converted a form suitable for communication in network 104. In one embodiment, network 104 may be a fibre-channel network and storage router may place or encapsulate the SCSI communications in fibre-channel frames for communications over storage network 104. In embodiments, storage router 106 may be a storage server.

System 100 allows client devices (not illustrated) access to large scale storage of network 104 by sending requests through hosts 102, which may act as general purpose servers. Hosts 102 may connect through IP network 108, which may be the Internet, an Intranet, a LAN or a WAN. A request, which may be a SCSI request, may be generated by host system 102, and may be encapsulated in one or more IP packets. The encapsulated SCSI request may be routed over IP network 108 and received by storage router 106. The storage router may extract the SCSI request from the one or more IP packets and may route the extracted SCSI request (e.g., through a virtual SCSI router) to storage network 104. Storage router 106 may have a fibre-channel network interface for connecting to network 104 which may be running a SCSI protocol. Although client devices 102 are referred to as clients, devices 102 may act as servers for other devices, such as other computer systems (not illustrated) which utilize system 100 for storage.

Although many embodiments of the present invention are described herein with respect to storage network 104 being a fibre-channel network through with fibre-channel protocol frames are communicated, these embodiments are also suitable to storage networks that implement other protocols including other storage area network specific protocols as well as file server protocols. Furthermore, many embodiments of the present invention are described herein with respect to utilizing the SCSI protocol for communications with a storage network. These embodiments are equally suitable to other types of communications with a storage network.

One example of suitable storage system may be found in U.S. patent application Ser. No. 10/128,656, filed Apr. 22, 2002, entitled, "SCSI-BASED STORAGE AREA NETWORK", which is assigned to the same assignee as the present application and incorporated herein by reference.

In accordance with embodiments of the present invention, driver software operating on one of client devices 102 may authenticate storage router 106. Client device 102 may send a proof of purchase (POP) request to storage router 106 over network 108 to authenticate storage router 106. The POP request may include a random number and one or more identifiers. The identifiers may include a server identifier which may identify storage router 106, a software driver identifier which may uniquely identify the driver software, and/or a client device identifier identifying client device 102. The driver software may permit storage related communications with storage router 106 when a hash received from storage router 106 matches a hash internally generated by the driver software running on client device 102. The driver software may also deny at least some storage related communications with storage router 106 when the hash received from storage router 106 does not match the internally generated hash. Storage router 106 may generate the hash using the random number received in the POP request, a secret key stored in storage router 106 and the one or more of the identifiers. At client device 102, the hash may be internally generated using the random number, a secret key stored in the driver software and the one or more identifiers. In some embodiments, the secret key may be stored in the software driver in secure fashion and may be encrypted or stored in split portions. In embodiments, the secret key may also be stored in storage router 106 in secure fashion in either a hardware or software form. Accordingly, the use of driver software, or at least features thereof, may be limited to an authenticated storage router, storage device, storage server or storage gateway.

Figure 1B:
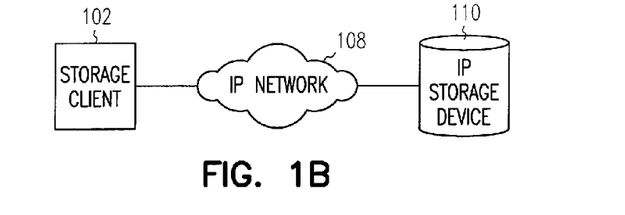
FIGS. 1B, 1C and 1D illustrate storage systems in accordance with other embodiments of the present invention.
Figure 1C:
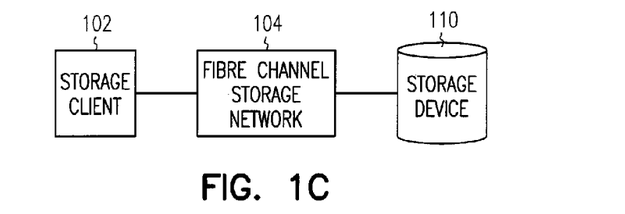
Figure 1D:
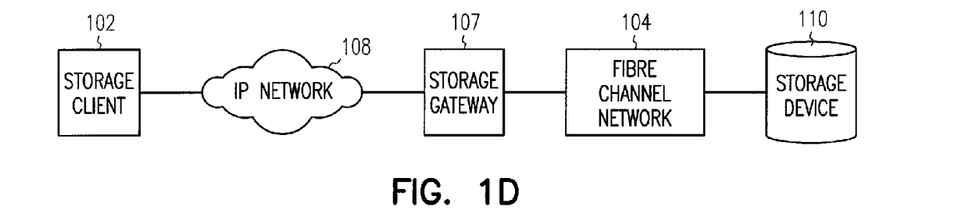

Although system 100 is described for authenticating storage router 106, embodiments of the present invention is equally suitable for the authentication of a storage device, such as device 110, by a client device, either directly or through other network elements such as a storage router, an IP network, fibre-channel storage network, storage gateway, or a combination thereof. FIGS. 1B, 1C and 1D illustrate storage systems in accordance with some of these other embodiments of the present invention. In FIG. 1B, storage client 102 may authenticate storage device 110 through IP network 108. In FIG. 1C, storage client 102 may authenticate storage device 110 through fibre-channel storage network 104. In FIG. 1D, storage client 102 may authenticate storage device 110 through IP network 108, storage gateway 107 and fibre-channel network 104. FIG. 1D also illustrates that storage client 102 may authenticate storage gateway 107 through IP network 108.

Figure 2:
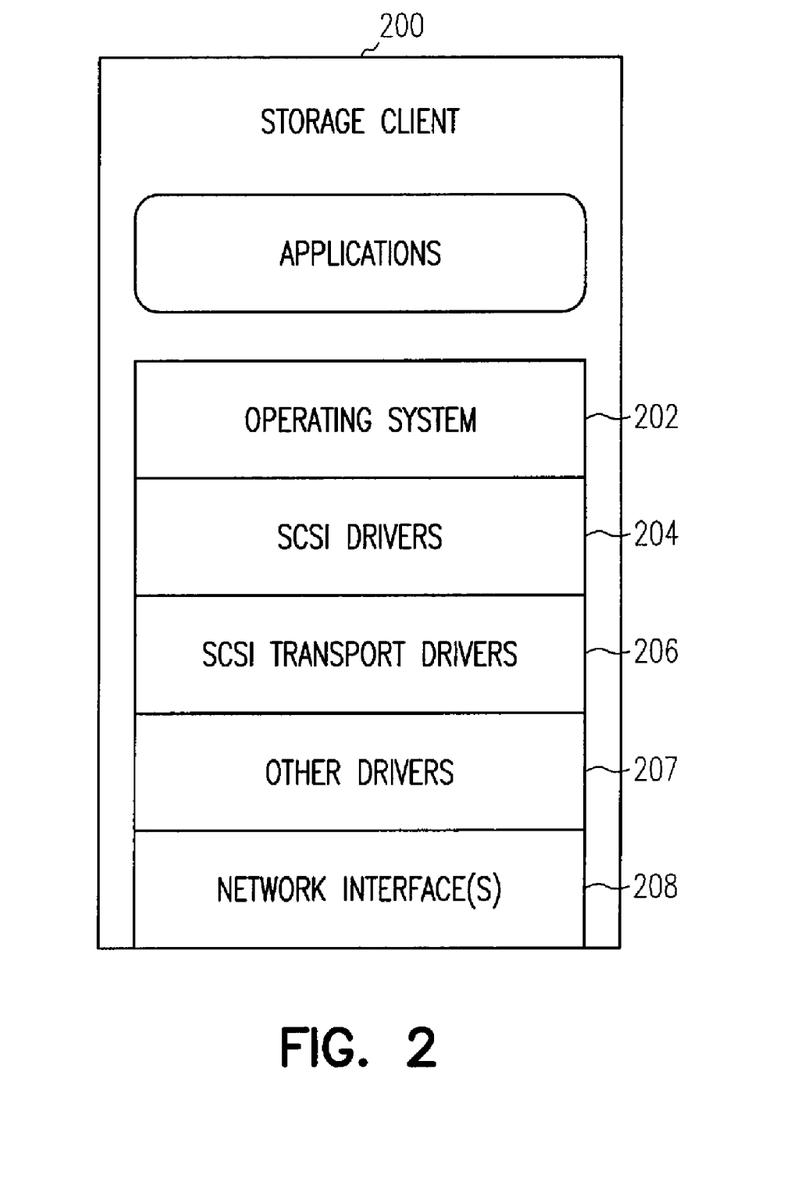
FIG. 2 is a simplified functional block diagram of a client device in accordance with embodiments of the present invention.

FIG. 2 is a simplified functional block diagram of a client device in accordance with an embodiment of the present invention. Storage client 200 may be suitable for use as one of client devices 102 (FIG. 1A) although other devices may also be suitable. In some embodiments, client device 200 may be a SCSI client device which communicates storage related communications in accordance with a SCSI protocol with a storage router. Device 200 may be almost any computer system, including as personal computer, server or other computing device. Device 200 may include operating system 202, other hardware and SCSI drivers 204, SCSI transport drivers 206, other drivers 208, and network interface 208. Network interface 208 may provide the physical level communications over a network. In embodiments, as part of storage related communications, network interface 208 may encapsulate SCSI requests and responses from drivers 206 as IP protocol packets and transmit the frames over an IP network such as network 108 (FIG. 1A). In these embodiments, as part of the storage related communications, network interface 208 may unencapsulate SCSI requests and responses received as IP protocol packets over an IP network and provide the SCSI requests and responses to drivers 206. The driver software used for storage related communications with a storage router may authenticate the storage router as described herein.

Operating system 202 may include almost any operating system including Windows, Linux, Solaris, etc. SCSI drivers 204 may be provided as part of operation system 202. SCSI transport drivers 206 may include transport drivers such as iSCSI, fibre-channel and/or Infiniband. Other drivers 207 may include TCP, IP or other network drivers including IPSec. In embodiments, other drivers 207 may be provided as part of operating system 202. Network interface 208 may include one or more network interfaces including, for example, Ethernet, OC-3, ATM, fibre-channel, Infiniband, etc.

Although device 200 is illustrated as having several separate functional elements, one or more of the functional elements may be combined and may be implemented by combinations of software configured elements, such as processing elements including digital signal processors (DSPs), and/or other hardware elements. For example, processing elements of device 200 (FIG. 2) may comprise one or more microprocessors, DSPs, application specific integrated circuits (ASICs), and combinations of various hardware and logic circuitry for at least performing the functions described herein. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Figure 3:
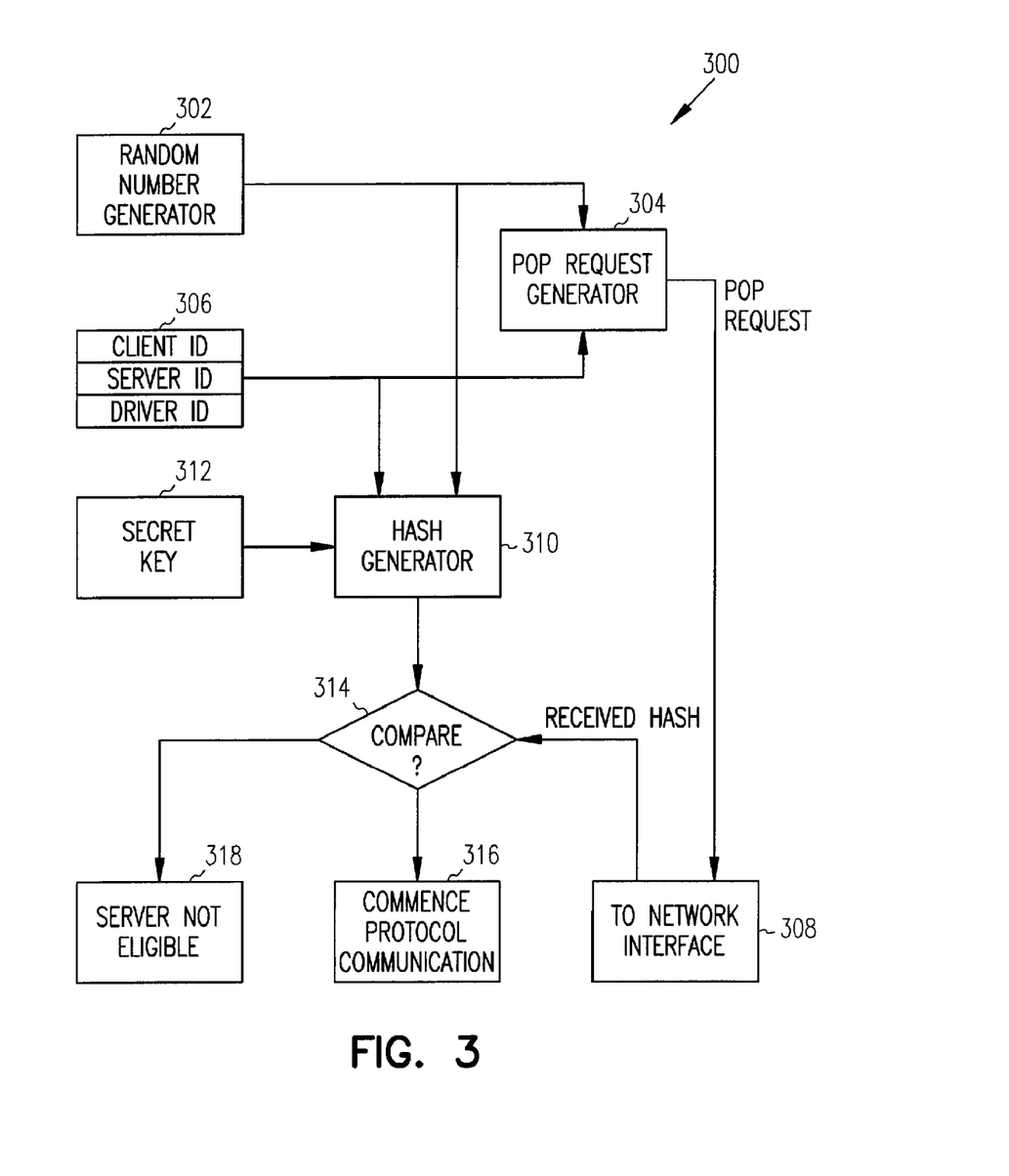
FIG. 3 is a simplified functional block diagram of software driver elements in accordance with embodiments of the present invention.

FIG. 3 is a simplified functional block diagram of software driver elements in accordance with an embodiment of the present invention. Driver elements 300 may illustrate some of the operations performed by elements of a software driver operating as part of drivers 206 (FIG. 2) of client device 200 (FIG. 2). Other elements may also be included in a driver. In embodiments, the functions of some of elements 300 may be performed by hardware portions of drivers 206 (FIG. 2), while the functions of other of elements 300 may be performed by software portions.

Driver elements 300 may include random number generator 302 for generating a random number. The random number may be any length depending on the ciphering algorithms used. In embodiments, the random number may be either a 128 bit or 256 bit random number generated, for example, by linear feedback shift register (LFSR). Driver elements 300 may also include proof of purchase (POP) request generator 304 which generates a POP request from the random number and one or more identifiers 306. Identifiers may include a server or storage device or storage router ID, a software driver ID and/or a client device ID. These identifiers may uniquely identify the software or device they are associated with. POP request generator may send a POP request to network interface 308, such as network interface 208 (FIG. 2) where it may be configured for communication with a storage device, including a storage gateway or storage router. In embodiments, the POP request may be generated upon installation of the software on a client device, or whenever a new or different storage device or storage router is communicated with.

Elements 300 may also include hash generator 310 which generates a hash from the random number generated for the POP request, secret key 312 and one or more identifiers 306. Hash generator 310 may utilize one of many cryptographic hashing functions depending on the key length. In one embodiment, hash generator may use a MD or SHA-1 one-way hash function, although almost any one-way hash function may be suitable. In one embodiment, secret key 312 may be stored in the client device as part of the driver software in an encrypted form. In this embodiment, the secret key may be decrypted prior to generating the internally generated hash. In another embodiment, secret key 312 may be stored in the client device as part of the software driver in split portions. In this embodiment, the split portions may be combined prior to generating the internally generated hash. Other techniques to help prevent the secret key from being compromised may also be used. For example, each portion of a split key may be encrypted.

Network interface 308 may also receive a hash from the storage device or storage router in response to the POP request. Comparison element 314 may compare a received hash received with the hash generated by hash generator 310. When the hashes match or compare, the storage device or storage router may be authenticated and element 316 may permit storage related communications with the storage device or storage router. When the hashes do not match or compare, the storage device or storage router is not authenticated and element 318 may deny at least some storage related communications with the storage device or storage router. In some embodiments, element 316 may enable some features of the driver software when the hash received from the storage device or storage router matches an internally generated hash. In these embodiments, element 318 may disable at least some features of the driver software when the hash received from the storage device or storage router does not match an internally generated hash, the features including a network boot function.

For the hash generated by hash generator 310 to match the hash received from the storage device or storage router, the random number, the secret key, the hashing function/algorithm, and the one or more identifiers used by hash generator 310 in generating the hash must be identical to the random number, secret key, hashing function/algorithm, and the one or more identifiers used by the storage device or storage router in generating the hash. Because the random number is different for each POP request, it is very difficult (almost impossible) for the client device to predict the hash that the storage device or storage router will reply with without access to the secret key. Accordingly, use of driver software can be limited to use with predetermined servers.

Figure 4:
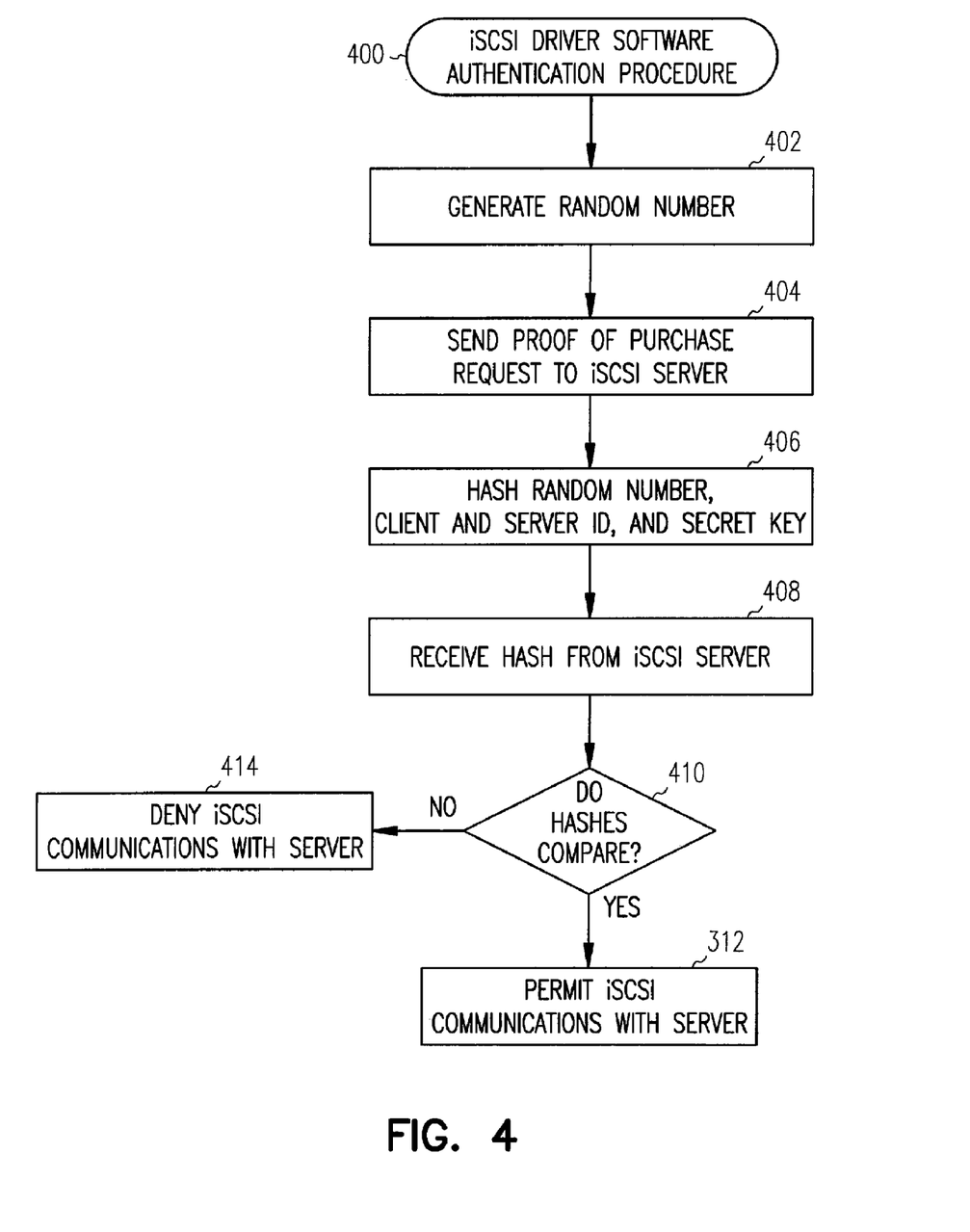
FIG. 4 is a flow chart of a driver software authentication procedure in accordance with embodiments of the present invention.

FIG. 4 is a flow chart of a driver software authentication procedure in accordance with an embodiment of the present invention. Procedure 400 may be performed by elements of a client device, such as one of devices 102 (FIG. 1A), and portions of procedure may be performed by hardware and/or software elements of a client device, such as one or more of elements 300 (FIG. 3). In embodiments, driver software operating on a software driver of a client device may perform at least portions of procedure 400.

In operation 402, a random number is generated. In one embodiment, operation 402 may be performed by random number generator 302 (FIG. 3). In operation 404, a proof of purchase (POP) request is generated and sent to a server, such as a storage device, storage router or SCSI server to authenticate the server. In one embodiment, operation 404 may be performed by POP request generator 304 (FIG. 3). The POP request may include the random number and one or more identifiers which may uniquely identify the server, client device, and/or driver software. In operation 406, the client device may generate a hash using a secret key, the random number and one or more identifiers. In one embodiment, operation 406 may be performed by hash generator 310 (FIG. 3). In operation 408, the client device may receive a hash from server in response to the POP request. In operation 410, the hashes may be compared. Operation 410 may be performed by compare element 314 (FIG. 3). Operation 412 may be performed when the hashes match, and operation 414 may be performed when the hashes do not match.

Operation 412 may permit the software driver to engage in storage related communications (e.g., SCSI protocol communications) with the authenticated storage router, while operation 414 may deny the software driver from engaging in storage related communications with the unauthenticated storage router. In some embodiments, operation 412 may enable certain functions or features of the driver software with the authenticated storage router, while operation 414 may disable certain functions or features of the driver software for storage related communications with the unauthenticated storage router.

Although the individual operations of procedure 400 are illustrated and described as separate operations, one or more of the individual operations may be performed concurrently and nothing requires that the operations be performed in the order illustrated.

Thus, a system and method that authenticates a storage router for use with particular driver software has been described. Also described is a system and method in which driver software, or at least features thereof, may be permitted to be used with particular storage devices or routers and which may be inhibited from being used with other storage devices or routers.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method for authenticating a server for communications with a software driver in a client device comprising:
    sending an authentication request to the server as part of an iSCSI logon request, the request including a random number and at least one identifier;
    internally generating a hash from the random number and the at least one identifier using a secret key stored in the client device;
    enabling at least some features of the software driver when a hash received from the server matches the internally generated hash; and
    disabling some but not all features of the software driver when either the hash received from the server does not match the internally generated hash or when the server fails to reply with a hash.

2. The method of claim 1 wherein the disabled features include a network boot function.

3. The method of claim 2 wherein the method further comprises generating the internally generated hash additionally using a client identifier uniquely identifying the client device and a server identifier uniquely identifying the server, and
    wherein the server to be authenticated generates the hash with a secret key stored at the server using the random number received in the authentication request, the client identifier and the server identifier, and sends the generated hash to the client device.

4. A software driver comprising instructions for execution by one or more processing devices and stored on a computer-readable medium, wherein the instructions cause the one or more processors to:
    send an authentication request to the server as part of an iSCSI logon request, the request including a random number and at least one identifier;
    internally generate a hash from the random number and the at least one identifier using a secret key stored in the client device;
    enable at least some features of the software driver when a hash received from the server matches the internally generated hash; and
    disable some but not all features of the software driver when either the hash received from the server does not match the internally generated hash or when the server fails to reply with a hash.

5. The software driver of claim 4 wherein the disabled features include a network boot function.

6. The software driver of claim 4 wherein the instructions further cause the processing devices to generate the internally generated hash additionally using a client identifier uniquely identifying the client device and a server identifier uniquely identifying the server, and wherein the server to be authenticated generates the hash with a secret key stored at the server using the random number received in the authentication request, the client identifier and the server identifier, and sends the generated hash to the client device.

7. A storage system comprising a server and a client device, wherein the client device authenticates the server for communications with a software driver within the client device, wherein the client device comprises:
- an interface to send an authentication request to the server as part of an iSCSI logon request, the request including a random number and at least one identifier; and
- processing circuitry to internally generate a hash from the random number and the at least one identifier using a secret key stored in the client device, enable at least some features of the software driver when a hash received from the server matches the internally generated hash, and disable some but not all features of the software driver when either the hash received from the server does not match the internally generated hash or when the server fails to reply with a hash.

8. The storage system of claim 7 wherein the disabled features include a network boot function.

9. The storage system of claim 8 wherein the processing circuitry generates the internally generated hash additionally using a client identifier uniquely identifying the client device and a server identifier uniquely identifying the server, and
- wherein the server to be authenticated generates the hash with a secret key stored at the server using the random number received in the authentication request, the client identifier and the server identifier, and sends the generated hash to the client device.

* * * * *